US005718792A

United States Patent [19]

Goode

[11] Patent Number: 5,718,792

[45] Date of Patent: Feb. 17, 1998

[54] METHOD FOR DECORATING SKI POLE SHAFTS

[75] Inventor: David P. Goode, Bloomfield Hills, Mich.

[73] Assignee: Goode Ski Technologies, Waterford, Mich.

[21] Appl. No.: 608,886

[22] Filed: Feb. 29, 1996

[51] Int. Cl.[6] .......................... B29C 63/00; B44C 1/165; A63C 11/22

[52] U.S. Cl. .......................... 156/228; 156/230; 156/240; 280/819

[58] Field of Search .......................... 156/212, 213, 156/215, 230, 240, 228, 290, 294; 280/819

[56] References Cited

U.S. PATENT DOCUMENTS

| | | | |
|---|---|---|---|
| 4,328,268 | 5/1982 | Tsuji et al. | 428/40 |
| 4,715,913 | 12/1987 | Middleton | 156/85 |
| 4,874,454 | 10/1989 | Talalay et al. | 156/359 |
| 4,980,008 | 12/1990 | Woods et al. | 156/230 |
| 5,397,636 | 3/1995 | Miyao et al. | 428/195 |
| 5,437,755 | 8/1995 | Lavorel et al. | 156/240 |

*Primary Examiner*—David A. Simmons
*Assistant Examiner*—J. A. Lorengo
*Attorney, Agent, or Firm*—Young & Basile, P.C.

[57] ABSTRACT

A method for decorating a composite fiber/resin ski pole, by applying a pre-printed transfer sheet of sublimation ink graphics in a conforming fit around the resin surface of the shaft, heating the transfer sheet to transfer the graphics from the sheet to the surface of the ski pole shaft, and subsequently removing the decorated shaft. In a preferred form, the transfer sheet is a sleeve having a pole-receiving slot whose inner surface contains the sublimation ink graphics and which conforms to the surface of the ski pole shaft when the shaft is inserted in the slot. In a most preferred form the sleeve defines multiple slots so that multiple poles can be inserted and simultaneously decorated by placing the sleeve in a suitable heating die.

13 Claims, 3 Drawing Sheets

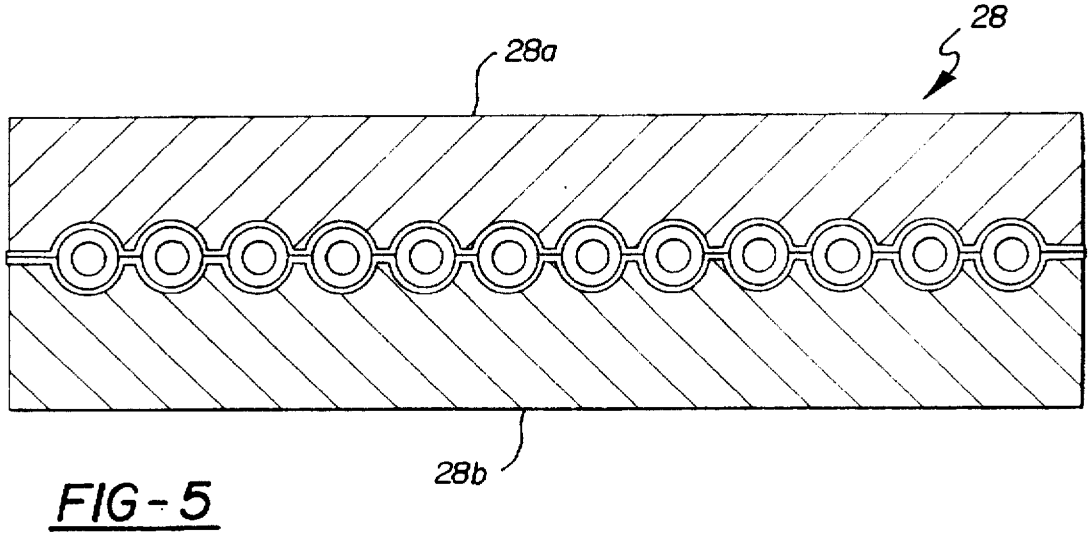
FIG-5
FIG-6
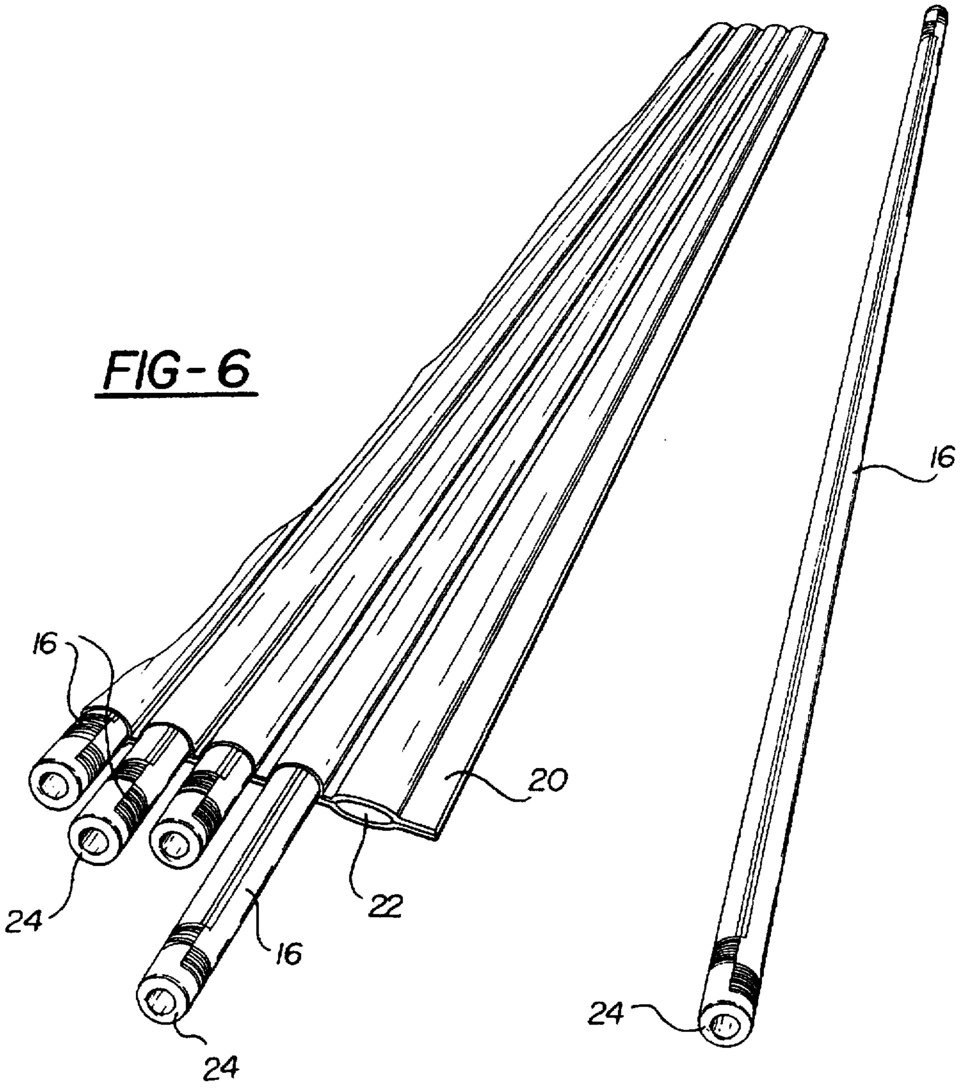

METHOD FOR DECORATING SKI POLE SHAFTS

FIELD OF THE INVENTION

The present invention is in the field of ski poles and more particularly in the field of methods for decorating the outer surfaces of ski pole shafts.

BACKGROUND OF THE INVENTION

Most ski pole shafts are decorated with pleasing patterns and colors to make them more attractive to customers. The current trend is toward complicated and multicolored patterns, which has increased the difficulty and cost of applying graphic decoration to the shafts.

Aluminum ski pole shafts are typically painted. Paint, however, is prone to chipping and scratching. Applying several different colors also requires multiple passes during the painting operation, increasing manufacturing time and cost. It also requires relatively sophisticated painting machinery.

The recent popularity of composite fiber/resin ski poles has created demand for a new decorating method. Because the polymer resin on the surface of these poles reacts favorably with certain inks, it has become known to use silkscreen application of graphics onto the surface. However, multicolored patterns or graphics still require multiple silkscreening passes, and this is therefore less than an ideal solution to the cost and time problems associated with applying multicolored graphics to ski pole shafts.

It is also known to sublimate certain inks directly onto a substrate. However, prior art sublimation techniques are limited to relatively flat surfaces, and do not lend themselves to decorating the cylindrical shafts of ski poles. Additionally, the fibers (fiberglass, graphite, Kevlar®, etc.) in the composite shafts do not accept coloring from sublimation inks.

SUMMARY OF THE INVENTION

The present invention is a novel method for sublimating graphics onto resin-surfaced ski pole shafts in an inexpensive, one-pass process. This novel adaptation of sublimation inking techniques to ski pole shafts reduces costs, allows for one-pass application of complicated, highly detailed graphics in multiple colors, and when applied properly provides a nearly chip-proof colored surface.

In general, the inventive method comprises the steps of forming a cylindrical sleeve of sublimation-inked paper with the desired graphics on the inside surface, inserting the ski pole shaft into the sleeve, and clamping the sleeved pole in a heated die to transfer the sublimation ink graphics from the paper of the sleeve onto the resin surface of the ski pole shaft.

In a preferred form, a set of matched top and bottom sublimation ink sheets, each including sublimation graphics to cover one longitudinal half of the ski pole shaft, are precisely fastened at the borders of the graphics patterns to form a pole-receiving sleeve or "cartridge". The pole is inserted in a close fit which, when clamped in a cylindrical heating die, precisely mates the two half-patterns onto the surface of the ski pole in a nearly seamless fit to cover the entire circumference of the ski pole shaft with the desired graphics pattern.

In a further form of the invention, each top and bottom pattern sheet is provided with multiple sets of sublimation graphics for multiple ski poles, and are subsequently fastened at the borders of the patterns to produce a sleeve capable of accepting a plurality of ski pole shafts at one time. Sleeves capable of holding up to twelve or more poles are possible, and are limited only by the size limitations of the heating die.

When the top and bottom sheets of the sublimation sleeves are fastened, typically by gluing, the sleeve is relatively flat. A further feature of the invention is the application of a removable, tapered guide tip to the pole to help guide it into the initially flat sublimation sleeve.

It has been found that sublimation works best on polyester or vinylester resins. While the resin surface of most composite ski pole shafts is suitable, the reinforcing fibers typically are not ink-friendly. In a preferred embodiment the graphics are sublimated onto a composite fiber/resin ski pole shaft using a polyester veil of the type disclosed, for example, in co-owned U.S. Pat. No. 5,265,911. The veil surrounds the filaments to ensure a resin-rich, ink-friendly surface for sublimation.

These and other features of the invention will become apparent upon further reading of the specification.

BRIEF DESCRIPTION OF THE DRAWINGS

FIG. 5 illustrates the heating die of FIG. 4 closed around the pole filled sleeve;

FIG. 6 schematically illustrates a finished pole removed from the sleeve; and, FIG. 7 is a cross-section of a preferred composite ski pole shaft structure used with the present invention.

DETAILED DESCRIPTION OF THE ILLUSTRATED EMBODIMENT

Figure 1:
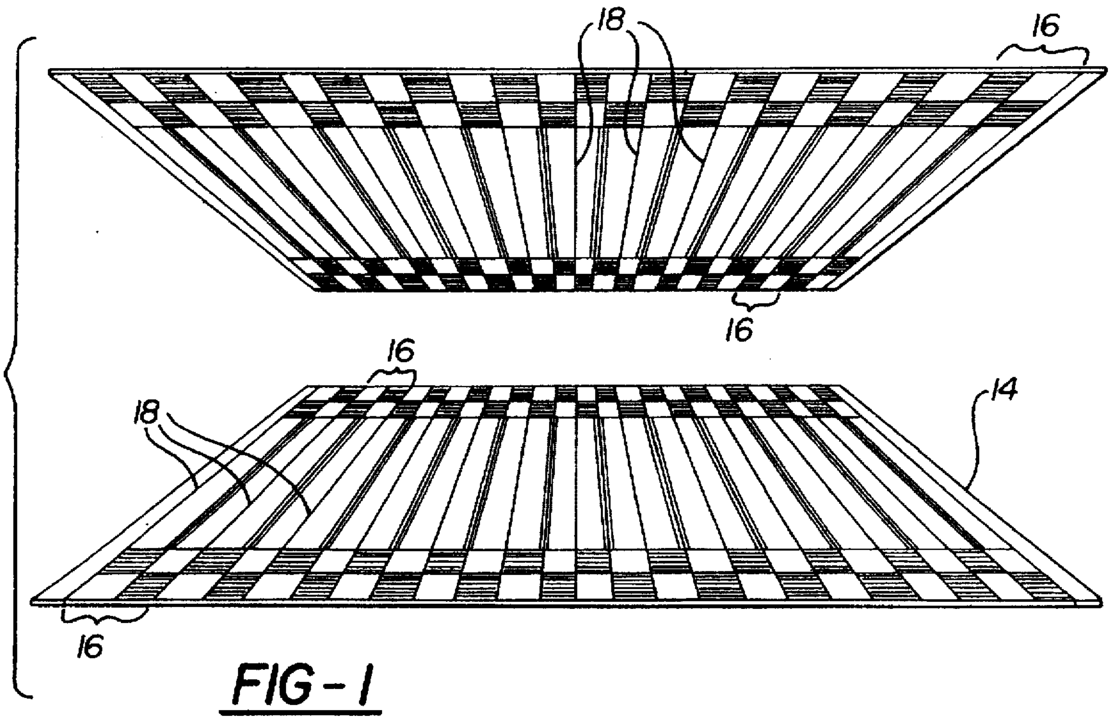
FIG. 1 is a perspective view of two spaced sublimation sheets as used with the method of the present invention.

Referring now to FIG. 1, a preferred embodiment of the present inventive method is illustrated using pre-printed sublimation pattern sheets 12 and 14 provided as matching pairs. Each sheet is provided with a plurality of graphic half-patterns 16 printed in sublimation ink. In the illustrated embodiment, each sheet contains approximately twelve half-patterns 16 running lengthwise, each half pattern being a rectangular strip capable of covering a half-circumference of the length of a ski pole shaft with the desired pattern along its length. The sublimation sheets and the sublimation inks in patterns 16 are commercially available from different sources. The pattern itself can be designed by the user. In the illustrated embodiment, the sheets are purchased from Classic Print Products in Burlington, N.C., and use a commercially available sublimation ink available from Flint Ink in Flint, Mich.

Also shown in FIG. 1 are a number of parallel glue lines 18 which, in the illustrated embodiment, have been silkscreened onto sheets 12, 14 to mark the longitudinal boundaries or edges of each half-pattern 16. It will be apparent to those skilled in the art that glue lines 18 may be applied in any known fashion.

Figure 2:
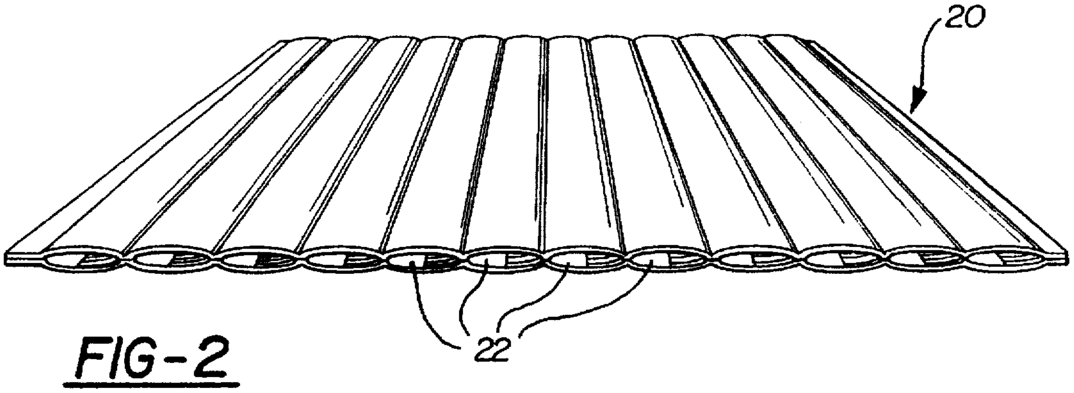
FIG. 2 illustrates the sheets of FIG. 1 fastened together to form a sublimation sleeve used with the present invention.

Referring now to FIG. 2, once glue lines 18 have been applied to sheets 12, 14, a suitable heat-resistant glue is carefully applied along the glue lines so as not to run over onto half-pattern 16. Sheets 12, 14 are then glued together to form a pole-receiving cartridge or sleeve 20 with a plurality of individual pole-receiving slots 22, in the illustrated embodiment twelve slots. The inside surface of each slot 22 comprises mated top and bottom half-patterns 16 (FIG. 1), each capable of covering half the circumference of a ski pole along its length.

Figure 3:
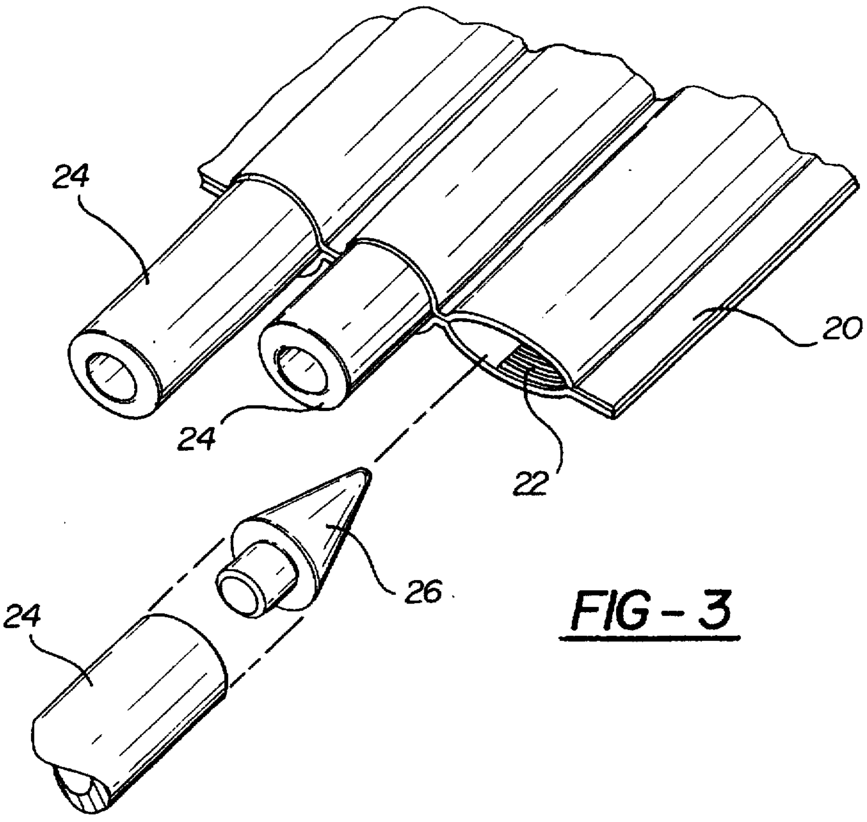
FIG. 3 illustrates the step of inserting uncolored ski pole shafts into the sleeve of FIG. 2.

Referring to FIG. 3, sleeve 20 is initially fairly flat when glued together. However, it is capable of receiving a ski pole shaft 24 in a snug, sliding fit such that the top and bottom half-patterns 16 conform closely to the surface of the ski pole shaft. Each sleeve 20 in the illustrated embodiment is capable of receiving up to twelve poles, although it will be apparent to those skilled in the art that sleeves can be built to accommodate almost any number of poles, from individual sleeves for an individual pole to sleeves with twelve or more pole slots.

Insertion of pole shafts 24 into slots 22 in sleeve 20 can be facilitated by the use of a removable, tapered guide tip 26 on the end of the pole to help open each slot 22 as the pole is inserted. In the illustrated embodiment tips 26 are formed from an inexpensive aluminum, and have a relatively smooth surface so as not to abrade the sublimation ink patterns on the inside of slots 22.

Figure 4:
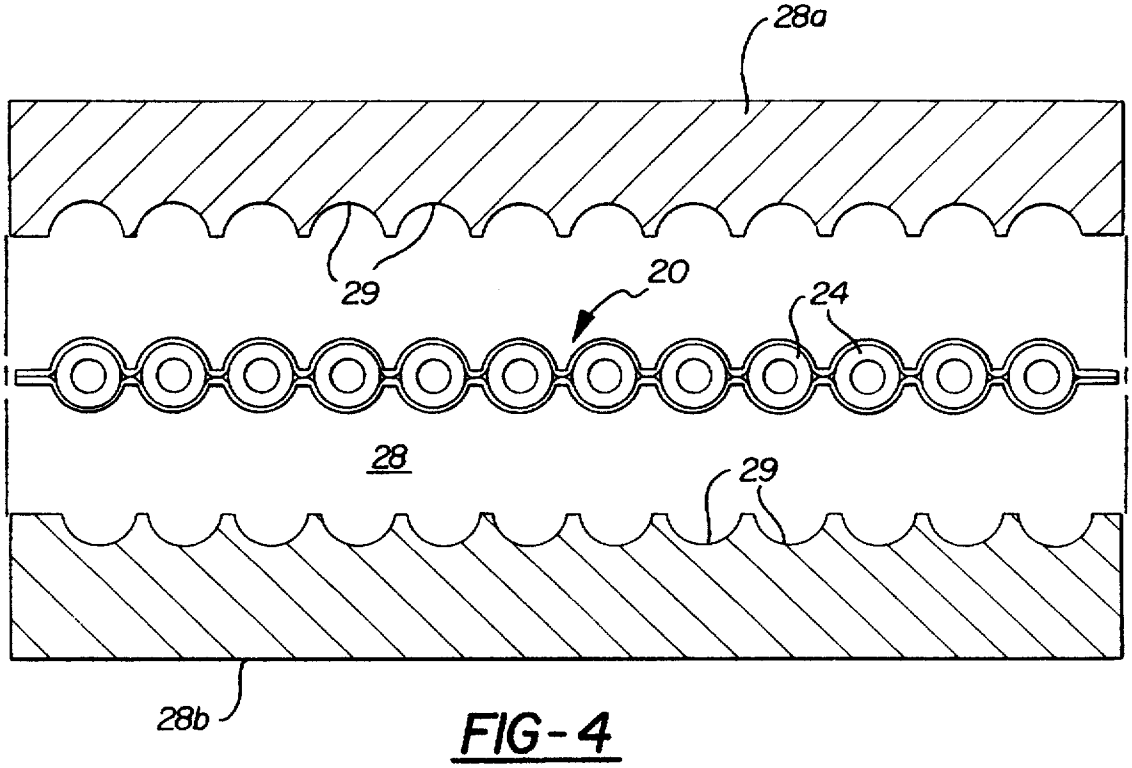
FIG. 4 illustrates the step of placing a sleeve filled with ski pole shafts into a heated die to transfer graphics onto the ski pole shafts.

Referring now to FIGS. 4 and 5, a pole-filled sleeve 20 is next inserted into a mating clamping die 28, which includes a plurality of pole-shaped die openings 29 of a diameter approximating the diameter of pole shafts 24 in sleeve 20. In the illustrated embodiment the clamping die 28 includes twelve slots 29 to match the twelve-pole sleeve 20. Again, however, clamping die 28 may be built to accommodate a single pole, twelve poles, or as many as desired. Once sleeve 20 and its pole shafts 24 are in position, upper half **28*a* is lowered onto lower half 28*b*** to heat the sleeve to a desired temperature for a time sufficient to transfer the sublimation ink to the surface of the pole shafts. In the illustrated embodiment the die is heated to approximately 415° F. for 60 to 80 seconds.

After heating, the sleeve with the poles still inside is removed and allowed to cool for a short period of time, and then the poles are removed (FIG. 6). At this point the graphics transfer is complete, and each pole now has a permanent graphics pattern over its entire visible surface, transferred directly (by sublimation) from the interior surfaces of sleeve 20.

Figure 7:
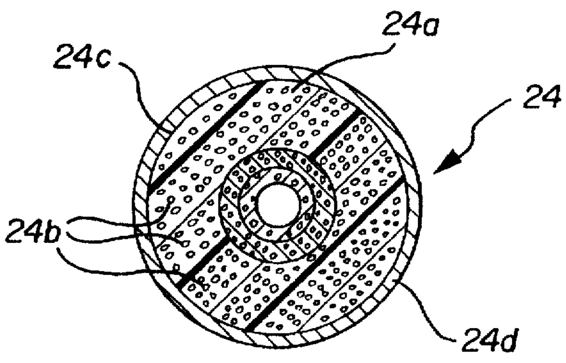

It has been found that the sublimation transfer works best with polyester or vinylester resins. It has also been found that the sublimation inks do not readily transfer to the carbon or other fibers located in the resin body of composite ski pole shafts for reinforcement. In view of these two factors, a preferred composite ski pole shaft structure has been determined for receiving graphics with the above-described process. Referring now to FIG. 7, finished pole shafts 24 comprise a resin body **24*a* with a large number of reinforcing filaments 24*b* (carbon, Kevlar®, fiberglass, etc.) distributed in the resin in suitable reinforcing patterns. Filaments 24*b* are surrounded by a veil 24*c*, in the illustrated embodiment a polyester veil, which provides anti-splinter protection by preventing filaments from protruding through the resin surface of the ski pole shaft. Veils of this type are disclosed, for example, in co-owned U.S. Pat. No. 5,265,911. This polyester veil also produces a resin-rich surface 24*d***, without filaments, which is readily compatible with sublimation inks. Additionally, the polyester material of the veil itself is ink-friendly, and together they produce a superior and preferred pole surface for the sublimation process described above.

While the veiled pole of FIG. 7 is a preferred ski pole structure for use with the above process, it will be apparent to those skilled in the art that other pole shaft structures can be used with the present invention as long as a suitable ink-friendly resin surface is presented.

Referring to FIG. 6, the result of the sublimation process is a graphics pattern which literally embeds itself into the material of the ski pole shaft. In the illustrated embodiment, it has been found that the graphics pattern extends approximately 0.020 inches into the surface of the pole. This makes it exceptionally durable, chip-and scratch-resistant, and generally more permanent than graphics applied with prior methods.

Additionally, the entire process is less expensive than painting or silkscreening; the patterns initially pre-printed on the sublimation sheets can be as intricate, detailed and multi-colored as desired, and can still be applied with a single "pass" through the heating die; and, batches of poles, up to twelve or more at a time, can be produced with different colors or patterns in a single batch by providing alternating half-patterns on the sublimination sheets. For example, sheets 14, 16 in FIG. 1 could be provided with twelve half-patterns 16, each of a different color and/or pattern.

Although the sublimated graphics pattern is extremely durable, it is possible to provide a subsequent coating, for example a polymer clearcoat, over the sublimated graphics surface.

While the foregoing is an illustrative example of the invention intended to satisfy the requirements of 35 U.S.C. §112, it should be understood that variations and modifications of the above-described method for decorating ski pole shafts will lie within the scope of the invention as defined by the appended claims. For example, while the illustrated method has been described with the use of two matched, top and bottom half-patterns mated together from separate sheets to form a slide-insertion slot for the shaft, it may be possible to apply the pre-printed pattern in rolling fashion around the ski pole shaft, or in some other manner. Heating times and temperatures may vary depending on the inks and patterns used. It may be desirable to apply a pattern over only a portion of the ski pole shaft, rather than along its entire length.

I accordingly claim:

1. A method for decorating ski pole shaft having polymer resin surfaces, comprising the following steps:

applying a pre-printed transfer sheet of sublimation ink graphics in a conforming fit around the surface of each of the shafts to be decorated, the transfer sheet comprising a pre-formed sleeve having a series of slots each capable of receiving a ski pole shaft in a conforming fit, the slots having interior surface provided with the sublimation ink graphics, such that a plurality of poles are inserted in the sleeve for simultaneous application of the sublimation ink graphics;

heating the sheet to transfer the graphics from the sheet to the resin surface of each ski pole shaft; and, subsequently removing the sheet.

2. A method for decorating a ski pole shaft having a polymer resin surface, comprising:

applying ski pole graphics to a transfer sheet in sublimation ink, the graphics being applied as a longitudinal half-pattern capable of covering approximately one-half circumference of a longitudinal portion of the shaft to be decorated;

mating two transfer sheets to a ski pole shaft in opposed fashion such that the half-patterns on the transfer sheets circumferentially mate to cover substantially the entire circumference of the longitudinal portion of the shaft to be decorated;

placing the transfer sheet covered ski pole shaft in a heating die which conforms to the surface of the ski pole shaft, heating the transfer sheets to transfer the graphics onto the resin surface of the shaft, and subsequently removing the shaft from the sheets.

3. The method of claim 2, wherein the transfer sheets are mated to each other prior to being mated to a ski pole shaft, such that the transfer sheets form a pre-formed sleeve defining at least one pole-receiving slot whose inner surfaces conform to the ski pole shaft when the shaft is inserted in the slot; the ski pole shaft is inserted into the slot; and, the sleeve-covered shaft is subsequently placed into the heating die.

4. The method of claim 3, wherein the pre-formed sleeve comprises a multi-pole sleeve having a plurality of pole-receiving slots for receiving a plurality of ski pole shafts, the method further comprising the step of placing the multi-pole sleeve in a heating die which conforms to the surfaces of the ski pole shafts in the sleeve to simultaneously heat and transfer the graphics onto the shafts.

5. The method of claim 4, wherein each transfer sheet is provided with a plurality of glue lines at a border of the half-patterns, and the transfer sheets are glued together along mating glue lines to form the plurality of pole-receiving slots.

6. The method of claim 2, wherein the graphics are multi-colored.

7. The method of claim 3, further including the step of attaching a removable guide means to an end of the ski pole shaft to aid insertion of the shaft into the slot.

8. A method for decorating a ski pole shaft having a polymer resin surface, comprising:

applying a pre-printed transfer sheet of sublimation ink graphics in a conforming fit around the surface of the shaft to be decorated;

heating the sheet to transfer the graphics from the sheet to the resin surface of the ski pole shaft;

subsequently removing the sheet; wherein, the ski pole shaft comprises a composite fiber/resin shaft.

9. The method of claim 8, wherein the composite fiber/resin shaft further includes veil means surrounding the fibers such that the outer surface of the shaft is resin only.

10. The method of claim 9, wherein the veil comprises a material which itself readily receives the sublimation ink.

11. The method of claim 2, wherein the ski pole shaft comprises a composite fiber/resin shaft.

12. The method of claim 11, wherein the composite fiber/resin shaft further includes veil means surrounding the fibers such that the outer surface of the shaft is resin without fibers.

13. The method of claim 12, wherein the veil comprises a material which readily receives the sublimation ink.

* * * * *